No. 828,314. PATENTED AUG. 14, 1906.
C. C. HILLS.
CREAM COOLER.
APPLICATION FILED AUG. 10, 1904.

Witnesses.
Florence Stockert
G. J. Mead

Inventor.
Clarance C. Hills
By J. C. & H. M. Sturgeon
Attys.

UNITED STATES PATENT OFFICE.

CLARANCE C. HILLS, OF EDINBORO, PENNSYLVANIA.

CREAM-COOLER.

No. 828,314. Specification of Letters Patent. Patented Aug. 14, 1906.

Application filed August 10, 1904. Serial No. 220,232.

*To all whom it may concern:*

Be it known that I, CLARANCE C. HILLS, a citizen of the United States, residing at Edinboro, in the county of Erie and State of Pennsylvania, have invented certain new and useful Improvements in Cream-Coolers; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to cream-coolers, and has for its object the production of a convenient mechanism for cooling cream as it flows from a separator.

A further object of my invention is to so construct a cream-cooler that there are few angles or corners therein with which the cream contacts and so that every part thereof is readily accessible for cleaning.

The features of my invention are hereinafter fully set forth, described, and illustrated in the accompanying drawings, in which—

Figure 1:
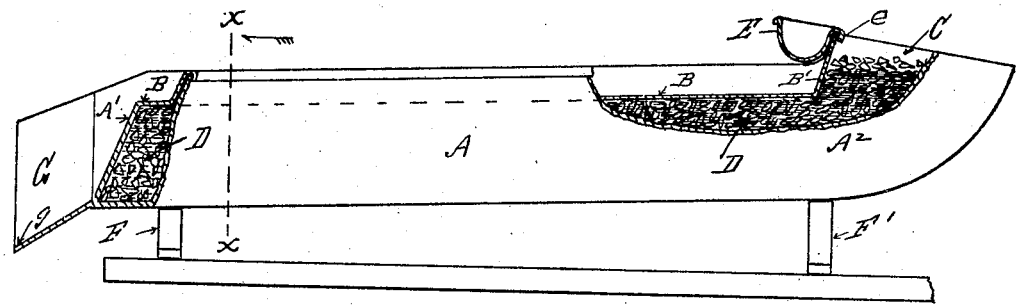
Figure 2:
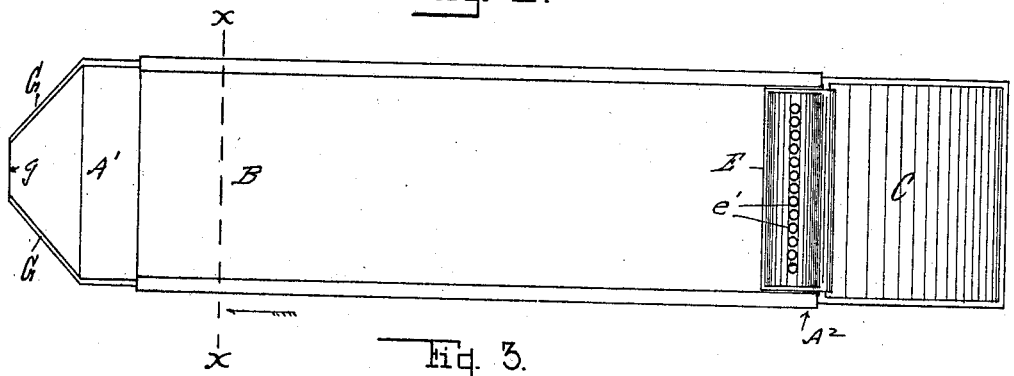
Figure 3:
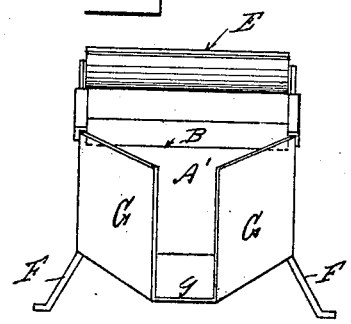
Figure 4:
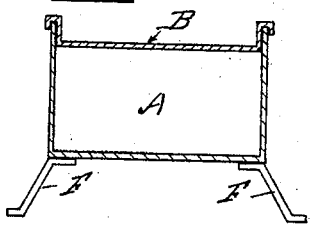

Figure 1 is a side view, partially in elevation and partially in section, of a cream-cooler embodying my invention. Fig. 2 is a top or plan view of the same. Fig. 3 is an end view in elevation of the same. Fig. 4 is a transverse section of the same on the line $xx$ in Figs. 1 and 2 looking in the direction of the arrow.

In the drawings illustrating my invention A is an oblong tank made, preferably, of sheet metal. The top B of this tank is formed up into a trough-like shape and extends at a slight inclination from the discharge end A' of the structure to a point near the receiving end $A^2$ thereof, where it is provided with an upturned wall B', leaving a portion C of the top of the tank open to receive broken ice and water D, with which the tank is filled up to the top B thereof, so that the top B is in contact with the water and ice at all times.

To the upturned end B' of the tank-top B I removably secure a transverse distributing-trough E by means of a lip $e$ on one edge thereof, which engages the upper edge of the upturned end B'. This distributing-trough E is preferably semicircular in shape and is provided with closed ends and with discharge-openings $e'$, through which the cream entering the trough E is distributed over the tank-top B, so that it will flow in a thin sheet thereon toward the discharge end A' of the apparatus. To facilitate the flow, the apparatus is supported at a convenient incline by means of short legs F' under the discharge end A' and longer legs F' under the receiving end $A^2$. The discharge end A' is provided with vertical wings G G, which operate to concentrate the cream as it flows from the discharge end of the top B, so that it will flow out of the discharge-spout $g$.

In operation the tank A is filled with ice and water to the top B thereof, and then the cream is allowed to flow into the distributing-trough E, from whence it is distributed through the holes $e'$ therein over the full width of the receiving end of the trough shaped top B, over which it then flows in a thin sheet until it is discharged from the discharge end A' thereof and thence out of the spout $g$, meanwhile having become completely cooled.

It will be observed that the construction of my apparatus is such that it can be constructed of such height that the distributing-trough E will receive the cream directly from a separator without additional handling and also that its construction is such that all the parts thereof are readily accessible for cleaning.

Having thus shown and described a convenient construction of my invention, which will enable others to construct and utilize the same, what I claim as new, and desire to secure by Letters Patent of the United States, is—

In a cream-cooler the combination of an inclined tank adapted to contain ice and water, having a charging-opening adapted to receive ice at its upper end, an unobstructed inclined plane throughout its entire upper side, another unobstructed inclined plane on its lower end leading from the first-mentioned inclined plane to the discharge, a contracted discharge-spout leading from the lower end of the last-mentioned inclined plane, and vertical end and side walls inclosing the upper end and sides of said inclined planes, substantially as shown and described.

In testimony whereof I affix my signature in presence of two witnesses.

CLARANCE C. HILLS.

Witnesses:
L. A. HILLS,
J. E. MCWILLIAMS.